United States Patent
Krishnan et al.

(10) Patent No.: US 11,032,546 B1
(45) Date of Patent: Jun. 8, 2021

(54) QUANTIZER FOR LOSSLESS AND NEAR-LOSSLESS COMPRESSION

(71) Applicant: TENCENT AMERICA LLC, Palo Alto, CA (US)

(72) Inventors: Madhu Peringassery Krishnan, Mountain View, CA (US); Xin Zhao, Santa Clara, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/065,974

(22) Filed: Oct. 8, 2020

Related U.S. Application Data

(60) Provisional application No. 63/054,049, filed on Jul. 20, 2020.

(51) Int. Cl.
*H04B 1/66* (2006.01)
*H04N 19/124* (2014.01)
(Continued)

(52) U.S. Cl.
CPC ........... *H04N 19/124* (2014.11); *H04N 19/12* (2014.11); *H04N 19/85* (2014.11)

(58) Field of Classification Search
CPC .. H04N 19/176; H04N 19/597; H04N 19/119; H04N 13/161; H04N 19/105; H04N 19/124; H04N 19/60; H04N 19/61; H04N 19/70; H04N 19/12; H04N 19/13; H04N 19/523; H04N 19/53; H04N 19/533; H04N 19/543; H04N 19/56; H04N 19/563;
(Continued)

(56) References Cited

U.S. PATENT DOCUMENTS

| | | | | |
|---|---|---|---|---|
| 8,600,156 B2* | 12/2013 | Yokose | ................ | H04N 19/176 382/166 |
| 2004/0126029 A1* | 7/2004 | Sakuyama | ............. | H04N 19/40 382/240 |

(Continued)

OTHER PUBLICATIONS

De Rivaz et al., "AV1 Bitstream & Decoding Process Specification", Version 1.0.0 with Errata 1, 2018, The Alliance for Open Media (681 pages total).

(Continued)

*Primary Examiner* — Masum Billah
(74) *Attorney, Agent, or Firm* — Sughrue Mion, PLLC

(57) ABSTRACT

A system includes code including obtaining code to obtain a first syntax element that indicates a first quantization index value; at least one second syntax element that indicates an offset value, a second quantization index value for another coefficient by combining the first quantization index value and the offset value to obtain a combined value, and modifying the combined value to be a predetermined minimum value as the second quantization index value, fourth obtaining code to obtain a quantization step size that corresponds to the second quantization index value; and determining code to determine a mode in which the coded image is to be decoded based on determining whether the first quantization index value is equal to a quantization index value associated with lossless coding, and based on determining whether the offset value is less than or equal to the quantization index value associated with the lossless coding.

20 Claims, 8 Drawing Sheets

(51) Int. Cl.
*H04N 19/85* (2014.01)
*H04N 19/12* (2014.01)

(58) Field of Classification Search
CPC .... H04N 19/567; H04N 19/57; H04N 19/577; H04N 19/593
USPC .......................................................... 375/240
See application file for complete search history.

(56) References Cited

U.S. PATENT DOCUMENTS

2017/0085917 A1* 3/2017 Hannuksela ......... H04N 19/523
2019/0306536 A1* 10/2019 Lim ..................... H04N 19/649

OTHER PUBLICATIONS

Bross et al., "General Video Coding Technology in Responses to the Joint Call for Proposals on Video Compression with Capability beyond HEVC", IEEE Transactions on Circuits and Systems for Video Technology, 2019, pp. 1-16 (16 pages total).
Chang et al., "Intra prediction using multiple reference lines for the versatile video coding standard", Proc. SPIE 11137, Applications of Digital Image Processing XLII, 1113716 (Sep. 6, 2019) (8 pages total).
Racape et al., "CE3-related: Wide-angle intra prediction for non-square blocks", Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K0500_r1-r4, (45 pages total).
Bross et al., "Versatile Video Coding (Draft 2)", Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K1001-v6 (141 pages total).
Bross et al., "CE3: Multiple reference line intra prediction (Test 1.1.1, 1.1.2, 1.1.3 and 1.1.4)", Joint Video Experts Team (JVET) of ITU-T SG 16 WP 3 and ISO/IEC JTC 1/SC 29/WG 11, 12th Meeting: Macao, CN, Oct. 3-12, 2018, JVET-L0283-v2 (7 pages total).
Zhao et al., "CE6: On 8-bit primary transform core (Test 6.1.3)", Joint Video Experts Team (JVET) of ITU-T SG 16 WP 3 and ISO/IEC JTC 1/SC 29/WG 11, 12th Meeting: Macao, CN, Oct. 3-12, 2018, JVET-L0285-r1 (18 pages total).
Zhao et al., "CE6: Fast DST-7/DCT-8 with dual implementation support (Test 6.2.3)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0497 (11 pages total).
Zhao et al., "CE6-related: Unified LFNST using block size independent kernel", Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O0539-v2 (19 pages total).
Zhao et al., "Non-CE6: Configurable max transform size in VVC", Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O0545-v2 (6 pages total).
Bross et al., "Versatile Video Coding (Draft 6)", Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O2001-vE (455 pages total).
Zhang et al., "Fast Adaptive Multiple Transform for Versatile Video Coding", 2019 Data Compression Conference, IEEE, pp. 63-72 (10 pages total).
Zhang et al., "Fast DST-7/DCT-8 with Dual Implementation Support for Versatile Video Coding", IEEE Transactions on Circuits and Systems for Video Technology, 2020 IEEE, pp. 1-17 (17 pages total).
Zhao et al., "Novel Statistical Modeling, Analysis and Implementation of Rate-Distortion Estimation for H.264/AVC Coders", IEEE Transactions on Circuits and Systems for Video Technology, vol. 20, No. 5, May 2010, pp. 647-660 (14 pages total).
Zhao et al., "NSST: Non-Separable Secondary Transforms for Next Generation Video Coding", 2016 Picture Coding Symposium (PCS), Nuremberg, 2016, pp. 1-5 (5 pages total).
Zhao et al., "Low-Complexity Intra Prediction Refinements for Video Coding", 2018 Picture Coding Symposium (PCS), San Francisco, CA, 2018, pp. 139-143 (5 pages total).
Zhao et al., "Joint Separable and Non-Separable Transforms for Next-Generation Video Coding", IEEE Transactions on Image Processing, vol. 27, No. 5, pp. 2514-2525, May 2018 (13 pages total).
Zhao et al., "Coupled Primary and Secondary Transform for Next Generation Video Coding", 2018 IEEE Visual Communications and Image Processing (VCIP), Taichung, Taiwan, 2018, pp. 1-4 (4 pages total).
Zhao et al., "CE3-related: Unified MPM list based on CE3-3.3 and CE3-3.5.1", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N0394-r2 (25 pages total).
Zhao et al., "Wide Angular Intra Prediction for Versatile Video Coding", 2019 Data Compression Conference (DCC), Snowbird, UT, USA, 2019, pp. 53-62 (10 pages total).
Chen et al., "Screen Content Coding Using Non-Square Intra Block Copy for HEVC", 2014 IEEE International Conference on Multimedia and Expo (ICME), Chengdu, 2014, pp. 1-6 (6 pages total).
Guo et al., "Inter-layer Adaptive Filtering for Scalable Extension of HEVC", 2013 Picture Coding Symposium (PCS), San Jose, CA, 2013, pp. 165-168 (4 pages total).
Guo et al., "Inter-layer Intra Mode Prediction for Scalable Extension of HEVC", 2013 Picture Coding Symposium (PCS), San Jose, CA, 2013, pp. 317-320 (4 pages total).
Lai et al., "Low Latency Directional Filtering for Inter-layer Prediction in Scalable Video Coding using HEVC", 2013 Picture Coding Symposium (PCS), San Jose, CA, 2013, pp. 269-272 (4 pages total).
Lai et al., "Combined Temporal and Inter-layer Prediction for Scalable Video Coding using HEVC", 2013 Picture Coding Symposium (PCS), San Jose, CA, 2013, pp. 117-120 (4 pages total).
Liu et al., "Global/Local Motion-Compensated Frame Interpolation for Low Bitrate Video", Apr. 2000, Proceedings of SPIE—The International Society for Optical Engineering 3974 (12 pages total).
Liu et al., "Nonlinear motion-compensated interpolation for low-bit-rate video", Proc. SPIE 4115, Applications of Digital Image Processing XXIII, (Dec. 28, 2000), pp. 203-213 (12 pages total).
Liu et al., "MCI-embedded motion-compensated prediction for quality enhancement of frame interpolation", Proc. SPIE 4209, Multimedia Systems and Applications III, (Mar. 22, 2001), pp. 251-261 (12 pages total).
Liu et al., "Bit Allocation for Video Coding with Temporal-Spatial Tradeoff", Advances in Multimedia Information Processing—PCM 2001. PCM 2001. Lecture Notes in Computer Science, vol. 2195., pp. 466-473 (10 pages total).
Liu et al., "Improved Video Coding via Adaptive Selection of Generalized Motion Prediction Modes for B Frames", Picture Coding Symposium 2001, pp. 358-361 (4 pages total).
Liu et al., "Complexity Reduction of Joint Temporal-Spatial Bit Allocation Using R-D Models for Video Streaming", IEEE ICIP 2002, pp. 729-732 (4 pages total).
Liu et al., "MPEG Video Transcoding with Joint Temporal-Spatial Rate Control", Proc. SPIE 4790, Applications of Digital Image Processing XXV, (Nov. 21, 2002), pp. 278-289 (13 pages total).
Liu et al., "Joint Temporal-Spatial Rate Control with Approximating Rate-Distortion Models", • Proceedings of SPIE—The International Society for Optical Engineering 4671:746-755 (10 pages total).
Liu et al., "Joint Temporal-Spatial Rate Control for Adaptive Video Transcoding", 2003 International Conference on Multimedia and Expo. ICME '03. Proceedings (Cat. No.03TH8698), Baltimore, MD, USA, 2003, pp. II-225 (4 pages total).
Liu et al., "Hybrid global-local motion compensated frame interpolation for low bit rate video coding", J. Vis. Commun. Image R., vol. 14 (2003) pp. 61-79 (19 pages total).
Liu et al., "Efficient MPEG-2 to MPEG-4 Video Transcoding", Proc. SPIE 5022, Image and Video Communications and Processing 2003, (May 7, 2003), pp. 186-195 (10 pages total).

(56) References Cited

OTHER PUBLICATIONS

Liu et al., "Joint Temporal—Spatial Bit Allocation for Video Coding With Dependency", IEEE Transactions on Circuits and Systems for Video Technology, vol. 15, No. 1, Jan. 2005, pp. 15-26 (12 pages total).

Liu et al., "Video Prediction Block Structure and the Emerging High Efficiency Video Coding Standard", Proceedings of The 2012 Asia Pacific Signal and Information Processing Association Annual Summit and Conference, Hollywood, CA, 2012, pp. 1-4 (4 pages total).

Liu et al., "Rectangular Partitioning for Intra Prediction in HEVC", 2012 Visual Communications and Image Processing, San Diego, CA, 2012, pp. 1-6 (6 pages total).

Lou et al., "Complexity and Memory Efficient GOP Structures Supporting VCR Functionalities in H.264/AVC", 2008 IEEE International Symposium on Circuits and Systems, Seattle, WA, 2008, pp. 636-639 (4 pages total).

Lou et al., "Trick-Play Optimization for H.264 Video Decoding", Journal of Information Hiding and Multimedia Signal Processing, 2009, pp. 1-13 (15 pages total).

Pu et al., "Palette Mode Coding in HEVC Screen Content Coding Extension", IEEE Journal on Emerging and Selected Topics in Circuits and Systems, vol. 6, No. 4, Dec. 2016, pp. 420-432 (13 pages total).

Liu et al., "Bit-depth Scalable Coding for High Dynamic Range Video", Proc. SPIE 6822, Visual Communications and Image Processing 2008, 68220O (Jan. 28, 2008) (12 pages total).

Sun et al., "Palette Mode—A New Coding Tool in Screen Content Coding Extensions of HEVC", 2015 IEEE International Conference on Image Processing (ICIP), Quebec City, QC, 2015, pp. 2409-2413 (5 pages total).

Sun et al., "Improved Palette Index Map Coding on HEVC SCC", 2016 IEEE International Conference on Image Processing (ICIP), Phoenix, AZ, 2016, pp. 4210-4214 (5 pages total).

Xu et al., "PU Level Intra Block Copying with Flipping Mode", Signal and Information Processing Association Annual Summit and Conference (APSIPA), 2014 Asia-Pacific, Siem Reap, 2014, pp. 1-7 (7 pages total).

Xu et al., "Block Vector Prediction in Intra Block Copy for HEVC Screen Content Coding", 2015 Data Compression Conference, Snowbird, UT, 2015, pp. 273-282 (10 pages total).

Xu et al., "Intra Block Copy in HEVC Screen Content Coding Extensions", IEEE Journal on Emerging and Selected Topics in Circuits and Systems, vol. 6, No. 4, pp. 1-11, Dec. 2016 (11 pages total).

Zhang et al., "Intra Mode Coding in HEVC Standard", 2012 Visual Communications and Image Processing, San Diego, CA, 2012, pp. 1-6 (6 pages total).

* cited by examiner

QUANTIZER FOR LOSSLESS AND NEAR-LOSSLESS COMPRESSION

CROSS-REFERENCE TO RELATED APPLICATION

This application claims priority from U.S. Provisional Application No. 63/054,049, filed on Jul. 20, 2020, the disclosure of which is incorporated herein by reference in its entirety.

FIELD

Embodiments of the present disclosure are directed to a set of advanced video coding technologies, and more particularly to quantizer technology for dealing with lossless/near-lossless compression.

BACKGROUND

AOMedia Video 1 (AV1) was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala published code in 2010, Google's experimental VP9 evolution project VP10 was announced on Sep. 12, 2014, and Cisco's Thor was published on Aug. 11, 2015. Building on the codebase of VP9, AV1 incorporates additional techniques, several of which were developed in these experimental formats. The first version, version 0.1.0, of the AV1 reference codec was published on Apr. 7, 2016. The Alliance announced the release of the AV1 bitstream specification on Mar. 28, 2018, along with a reference software-based encoder and decoder. On Jun. 25, 2018, a validated version 1.0.0 of the specification was released. On Jan. 8, 2019, "AV1 Bitstream & Decoding Process Specification" was released, which is a validated version 1.0.0 with Errata 1 of the specification. The AV1 bitstream specification includes a reference video codec. The"AV1 Bitstream & Decoding Process Specification" (Version 1.0.0 with Errata 1), The Alliance for Open Media (Jan. 8, 2019), is incorporated herein in its entirety by reference. AOMedia Video 2 (AV2) is currently under development and 8-bit/10-bit transform cores are designed for it.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

AV1 Quantization

Quantization of transform coefficients may apply different quantization step size for DC and AC transform coefficients, and different quantization step size for luma and chroma transform coefficients. To specify the quantization step size, in the frame header, a "base_q_idx" syntax element is first signaled, which is a 8-bit unsigned fixed length code specifying the quantization step size for luma AC coefficients. The valid range of "base_q_idx" is [0, 255]. After that, the delta value relative to "base_q_idx" for Luma DC coefficients, indicated as "DeltaQYDc" is further signaled. Furthermore, if there are more than one color plane, then a flag "diff_uv_delta" is signaled to indicate whether Cb and Cr color components apply different quantization index values. If "diff_uv_delta" is signaled as 0, then only the delta values relative to "base_q_idx" for chroma DC coefficients (indicated as "DeltaQUDc") and AC coefficients (indicated as "DeltaQUAc") are signaled. Otherwise, the delta values relative to "base_q_idx" for both the Cb and Cr DC coefficients (indicated as "DeltaQUDc" and "DeltaQVDc") and AC coefficients (indicated as "DeltaQUAc" and "DeltaQVAc") are signaled. The delta values are signaled as signed 6-bit integer.

Figure 5:
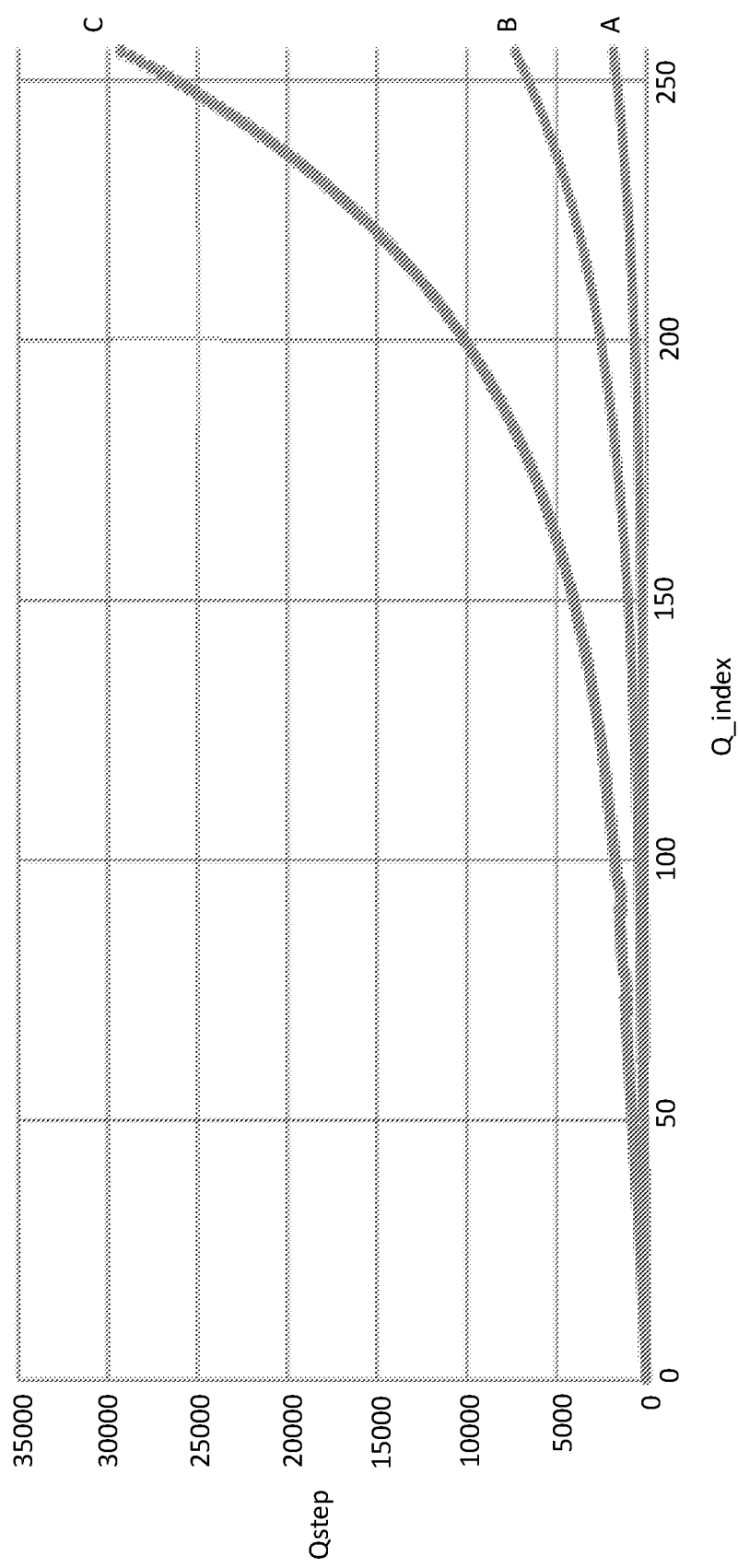
FIG. 5 is a graph that illustrates an example qindex to Qstep mapping for AC coefficients in a table.
Figure 6:
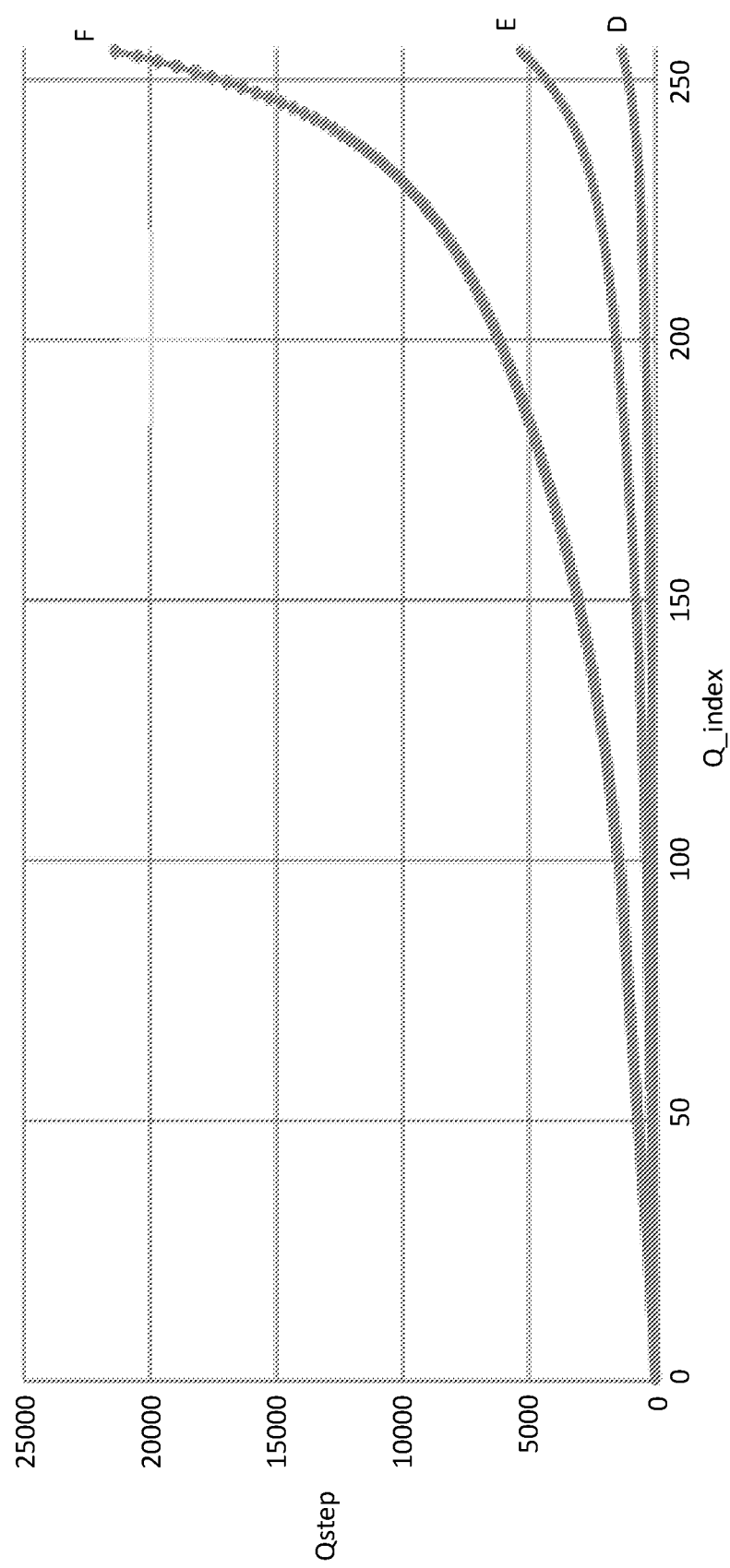
FIG. 6 is a graph that illustrates an example qindex to Qstep mapping for DC coefficients in a table.

The above decoded "DeltaQYDc", "DeltaQUAc", "DeltaQUDc", "DeltaQVAc" and "DeltaQVDc" are added to "base_q_idx" to derive the quantization indices "qindex". Then, these indices "qindex" are further mapped to quantization step size according to two tables. For DC coefficients, the mapping from quantization index to quantization step size for 8-bit, 10-bit, and 12-bit internal bit depth is specified by a lookup table "Dc_Qlookup[3][256]", and the mapping from quantization index to quantization step size for 8-bit, 10-bit, and 12-bit is specified by a lookup table "Ac_Qlookup[3][256]". An example of the "qindex" to "Qstep" mapping for AC coefficients in a table is illustrated in FIG. 5, and an example of the "qindex" to "Qstep" mapping for DC coefficients in a table is illustrated in FIG. 6. Referring to the graph 500 of FIG. 5, 8-bit AC is shown with a line that is referenced with the letter "A", 10-bit AC is shown with a line that is referenced with the letter "B", and 12-bit AC is shown with a line that is referenced with the letter "C". Referring to graph 600 of FIG. 6, 8-bit DC is shown with a line that is referenced with the letter "D", 10-bit DC is shown with a line that is referenced with the letter "E", and 12-bit DC is shown with a line that is referenced with the letter "F".

Modified Quantization Being Studied in AV2

In the ongoing AV2 development process, the following tool has been proposed regarding to the quantizer design:

The separate look up tables "Dc_Qlookup[3][256]" and "Ac_Qlookup[3][256]" are removed. Only a unified lookup table "Ac_Qlookup[256]" is kept and two additional sequence level syntax parameters ("base_y_dc_delta_q", "base_uv_ dc_delta_ q") specify the DC offset for luma and chroma. The DC quantization step sizes for luma and chroma are obtained from the "Ac_Qlookup[256]" using the offset in addition to the frame level delta's specified in AV1 quantization.

In AV1, quantization step size to use is selected from the lookup tables using the following:

Dc_Qlookup[3][clip(base_q_idx+delta_dc,0,255)] for luma/chroma DC coefficients

Ac_Qlookup[3][clip(base_q_idx+delta_ac,0,255)] for chroma AC coefficients

Ac_Qlookup[3][clip(base_q_idx,0,255)] for luma AC coefficients where "delta_dc" can be anyone of "DeltaQYDc", "DeltaQUDc", or "DeltaQVDc"; and "delta_ac" can be anyone of "DeltaQUAc" and "DeltaQVAc", and the clip( ) function clips the value between 0 and 255.

With the quantizer design in AV1 as well as the modified quantizer proposed for AV2, the quantization step size to use is selected from the lookup table using:

Dc_Qlookup[clip(base_q_idx+delta_dc,0,255)] for luma/chroma DC coefficients

Ac_Qlookup[clip(base_q_idx+delta_ac,0,255)] for chroma AC coefficients

Ac_Qlookup[clip(base_q_idx,0,255)] for luma AC coefficients where delta_dc can be anyone of "DeltaQYDc"-"base_y_dc _delta q", "DeltaQUDc"-"base_uv_ dc_delta_ q", or "DeltaQVDc"-"base_uv_ dc_delta_ q"; and "delta_ac" can be anyone of "DeltaQUAc" and "DeltaQVAc", and the clip ( ) function clips the value between 0 and 255.

Moreover, to code the block using the lossless mode in the related art, all the following conditions have to be met in related art:

base_q_idx==0
DeltaQYDc==0
DeltaQUAc==0
DeltaQUDc==0
DeltaQVAc==0
DeltaQVDc==0

With the tool proposed for AV2, the conditions for lossless mode is changed to:

base_q_idx==0
DeltaQYDc-base_y_dc _delta_q<=0
DeltaQUAc==0
DeltaQUDc-base_uv_ dc_delta_ q<=0
DeltaQVAc==0
DeltaQVDc-base_uv_ dc_delta_ q<=0

If all the above conditions are met, the selected step size is 4 (after taking into consideration the scaling factor of 4 introduced by the invertible 4-point Walsh-Hadamard transform used in lossless mode). But when the conditions described above are not met (lossy mode) and base_q_idx+delta_dc<=0 or base_q_idx+delta_ac<=0, then the clip (base_q_idx+delta_dc) or clip(base_q_idx+delta_ac) will result in the "qindex" value zero and the selected step size is still 4. The transforms used in this case will be one among combinations of discrete cosign transform (DCT), asymmetric discrete sine transform (ADST), or identity transform (IDTX), which introduces a scaling factor of 8. This will result in a lossy coding mode, albeit with a bitrate higher than lossless mode (but with a lower peak signal to noise ratio (PSNR) for luma and chroma). Accordingly, the related art has a problem in that the lossy coding mode may result with a higher bit rate than the lossless coding mode.

Embodiments of the present disclosure solve the above problem and/or other problems.

Embodiments of the present disclosure may provide a set of advanced video coding technologies that provide efficient compression of video data. Embodiments of the present disclosure may provide quantizer technologies that provide for lossless/near-lossless compression in AV2.

According to one or more embodiments, a system is provided. The system includes at least one memory configured to store computer program code; and at least one processor configured to access the computer program code and operate as instructed by the computer program code. The computer program code includes: first obtaining code configured to cause the at least one processor to obtain a first syntax element that indicates a first quantization index value for an AC coefficient of a coded image; second obtaining code configured to cause the at least one processor to obtain at least one second syntax element that indicates an offset value; third obtaining code configured to cause the at least one processor to obtain a second quantization index value for another coefficient of the coded image by combining the first quantization index value of the first syntax element and the offset value of the at least one second syntax element to obtain a combined value, and modifying, in a case where the combined value is less than a predetermined minimum value, the combined value to be the predetermined minimum value as the second quantization index value; fourth obtaining code configured to cause the at least one processor to obtain a quantization step size that corresponds to the second quantization index value that is obtained; determining code configured to cause the at least one processor to determine whether a mode in which the coded image is to be decoded is a lossy mode or a lossless mode based on determining whether the first quantization index value is equal to a quantization index value associated with lossless coding, and based on determining whether the offset value is less than or equal to the quantization index value associated with the lossless coding; first setting code configured to cause the at least one processor to set the predetermined minimum value to a value, that is compared to the combined value, based on the determining of the determining code; and decoding code configured to cause the at least one processor to decode the coded image in the lossy mode or the lossless mode based on the determining of the determining code, and by using the quantization step size that is obtained.

According to an embodiment, the first setting code is configured to cause the at least one processor to set the predetermined minimum value to the quantization index value associated with the lossless coding, based on determining that the first quantization index value is equal to the quantization index value associated with the lossless coding, and based on determining that the offset value is less than or equal to the quantization index value associated with the lossless coding.

According to an embodiment, the quantization index value associated with the lossless coding is 0.

According to an embodiment, the quantization index value associated with the lossless coding is a positive integer value greater than 0.

According to an embodiment, the first setting code is configured to cause the at least one processor to set the predetermined minimum value to a value different from the quantization index value associated with the lossless coding, based on determining that the first quantization index value is not equal to the quantization index value associated with the lossless coding, or based on determining that the offset value is greater than the quantization index value associated with the lossless coding.

According to an embodiment, the quantization index value associated with the lossless coding is 0.

According to an embodiment, the quantization index value associated with the lossless coding is a value different from 0.

According to an embodiment, the fourth obtaining code is configured to cause the at least one processor to obtain the quantization step size that corresponds to the second quantization index value by using at least one lookup table that indicates a correspondence between a plurality of quantization index values and a plurality of quantization step sizes, and the computer program code further includes second setting code configured to cause the at least one processor to set, in the at least one lookup table, a quantization step size associated with the quantization index value associated with the lossless coding.

According to an embodiment, the second setting code is configured to cause the at least one processor to perform an operation of multiplying $2^x$ by 4, wherein x is predetermined value, and to set, in the at least one lookup table, the quantization step size associated with the quantization index value associated with the lossless coding to a result of the operation.

According to an embodiment, the fourth obtaining code is configured to cause the at least one processor to obtain the quantization step size that corresponds to the second quantization index value by using at least one lookup table that indicates a correspondence between a plurality of quantization index values and a plurality of quantization step sizes, and the computer program code further includes second setting code configured to cause the at least one processor to set, in the at least one lookup table, a quantization step size associated with one of the plurality of quantization index values associated with lossy coding.

According to an embodiment, the second setting code is configured to cause the at least one processor to perform an operation of multiplying $2^x$ by 8, wherein x is a predetermined value, and to set, in the at least one lookup table, the quantization step size associated with one of the plurality of quantization index values associated with the lossy coding to a result of the operation.

According to one or more embodiments, a method is provided. The method includes: obtaining a first syntax element that indicates a first quantization index value for an AC coefficient of a coded image; obtaining at least one second syntax element that indicates an offset value; obtaining a second quantization index value for another coefficient of the coded image by combining the first quantization index value of the first syntax element and the offset value of the at least one second syntax element to obtain a combined value, and modifying, based on the combined value being less than a predetermined minimum value, the combined value to be the predetermined minimum value as the second quantization index value; obtaining a quantization step size that corresponds to the second quantization index value that is obtained; determining whether a mode in which the coded image is to be decoded is a lossy mode or a lossless mode based on determining whether the first quantization index value is equal to a quantization index value associated with lossless coding, and based on determining whether the offset value is less than or equal to the quantization index value associated with the lossless coding; setting the predetermined minimum value to a value, that is compared to the combined value, based on the determining; and decoding the coded image in the lossy mode or the lossless mode based on the determining, and by using the quantization step size that is obtained.

According to an embodiment, the setting includes setting predetermined minimum value to the quantization index value associated with the lossless coding, based on determining that the first quantization index value is equal to the quantization index value associated with the lossless coding, and based on determining that the offset value is less than or equal to the quantization index value associated with the lossless coding.

According to an embodiment, the quantization index value associated with the lossless coding is a positive integer value greater than 0.

According to an embodiment, the setting includes setting the predetermined minimum value to a value different from the quantization index value associated with the lossless coding, based on determining that the first quantization index value is not equal to the quantization index value associated with the lossless coding, or based on determining that the offset value is greater than the quantization index value associated with the lossless coding.

According to an embodiment, the quantization index value associated with the lossless coding is a value different from 0.

According to an embodiment, the obtaining the quantization step size includes obtaining the quantization step size that corresponds to the second quantization index value by using at least one lookup table that indicates a correspondence between a plurality of quantization index values and a plurality of quantization step sizes, and the method further includes setting, in the at least one lookup table, a quantization step size associated with the quantization index value associated with the lossless coding.

According to an embodiment, the obtaining the quantization step size includes obtaining the quantization step size that corresponds to the second quantization index value by using at least one lookup table that indicates a correspondence between a plurality of quantization index values and a plurality of quantization step sizes, and the method further includes setting, in the at least one lookup table, a quantization step size associated with one of the plurality of quantization index values associated with lossy coding.

According to an embodiment, the setting includes performing an operation of multiplying $2^x$ by 8, wherein x is a predetermined value, and setting, in the at least one lookup table, the quantization step size associated with the one of the plurality of quantization index values associated with the lossy coding to a result of the operation.

According to one or more embodiments, a non-transitory computer-readable medium storing computer instructions is provided. The computer instructions are configured to, when executed by at least one processor, cause the at least one processor to: obtain a first syntax element that indicates a first quantization index value for an AC coefficient of a coded image; obtain at least one second syntax element that indicates an offset value; obtain a second quantization index value for another coefficient of the coded image by combining the first quantization index value of the first syntax element and the offset value of the at least one second syntax element to obtain a combined value, and modifying, based on the combined value being less than a predetermined minimum value, the combined value to be the predetermined minimum value as the second quantization index value; obtain a quantization step size that corresponds to the second quantization index value that is obtained; determine whether a mode in which the coded image is to be decoded is a lossy mode or a lossless mode based on determining whether the first quantization index value is equal to a quantization index value associated with lossless coding, and based on determining whether the offset value is less than or equal to the quantization index value associated with the lossless coding;

set the predetermined minimum value to a value, that is compared to the combined value, based on the determining; and decode the coded image in the lossy mode or the lossless mode based on the determining, and by using the quantization step size that is obtained.

Figure 1:
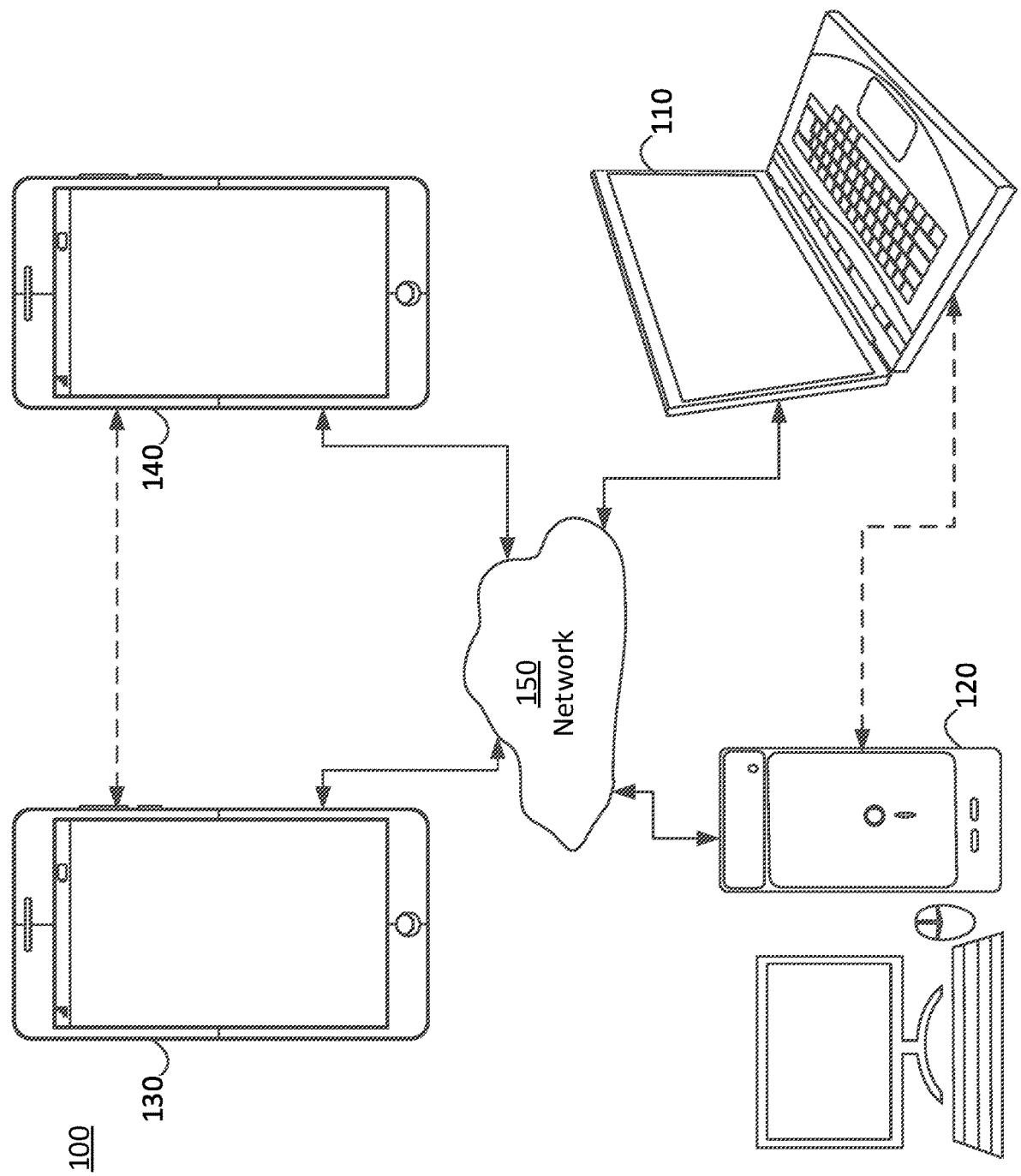
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data, and may display the recovered video data at a local display device.

In FIG. 1, the terminals (110-140) may be illustrated as servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
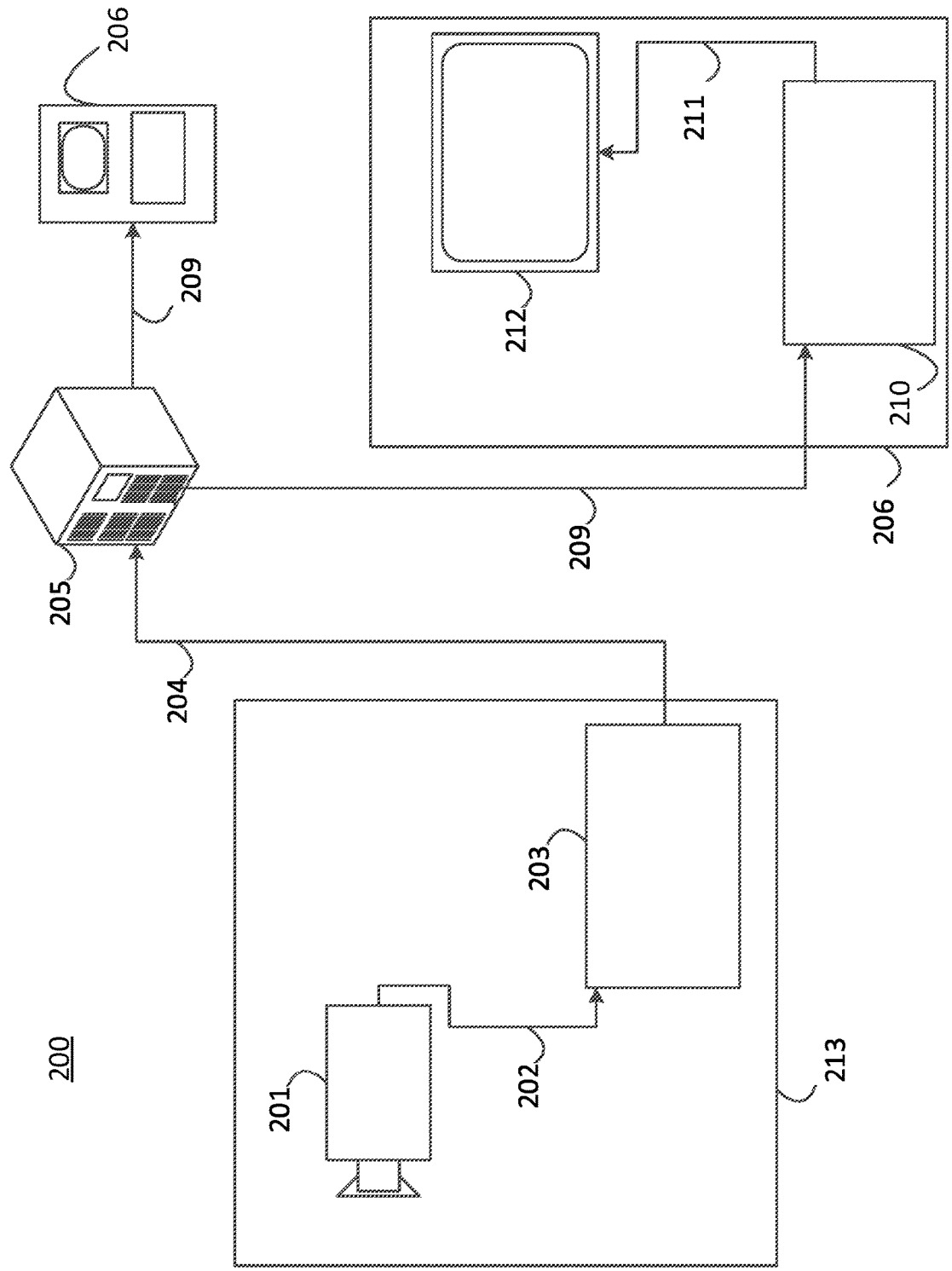
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

As illustrated in FIG. 2, a streaming system (200) may include a capture subsystem (213) that can include a video source (201) and an encoder (203). The video source (201) may be, for example, a digital camera, and may be configured to create an uncompressed video sample stream (202). The uncompressed video sample stream (202) may provide a high data volume when compared to encoded video bitstreams, and can be processed by the encoder (203) coupled to the camera (201). The encoder (203) can include hardware, software, or a combination thereof to enable or implement aspects of the disclosed subject matter as described in more detail below. The encoded video bitstream (204) may include a lower data volume when compared to the sample stream, and can be stored on a streaming server (205) for future use. One or more streaming clients (206) can access the streaming server (205) to retrieve video bit streams (209) that may be copies of the encoded video bitstream (204).

In embodiments, the streaming server (205) may also function as a Media-Aware Network Element (MANE). For example, the streaming server (205) may be configured to prune the encoded video bitstream (204) for tailoring potentially different bitstreams to one or more of the streaming clients (206). In embodiments, a MANE may be separately provided from the streaming server (205) in the streaming system (200).

The streaming clients (206) can include a video decoder (210) and a display (212). The video decoder (210) can, for example, decode video bitstream (209), which is an incoming copy of the encoded video bitstream (204), and create an outgoing video sample stream (211) that can be rendered on the display (212) or another rendering device (not depicted). In some streaming systems, the video bitstreams (204, 209) can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
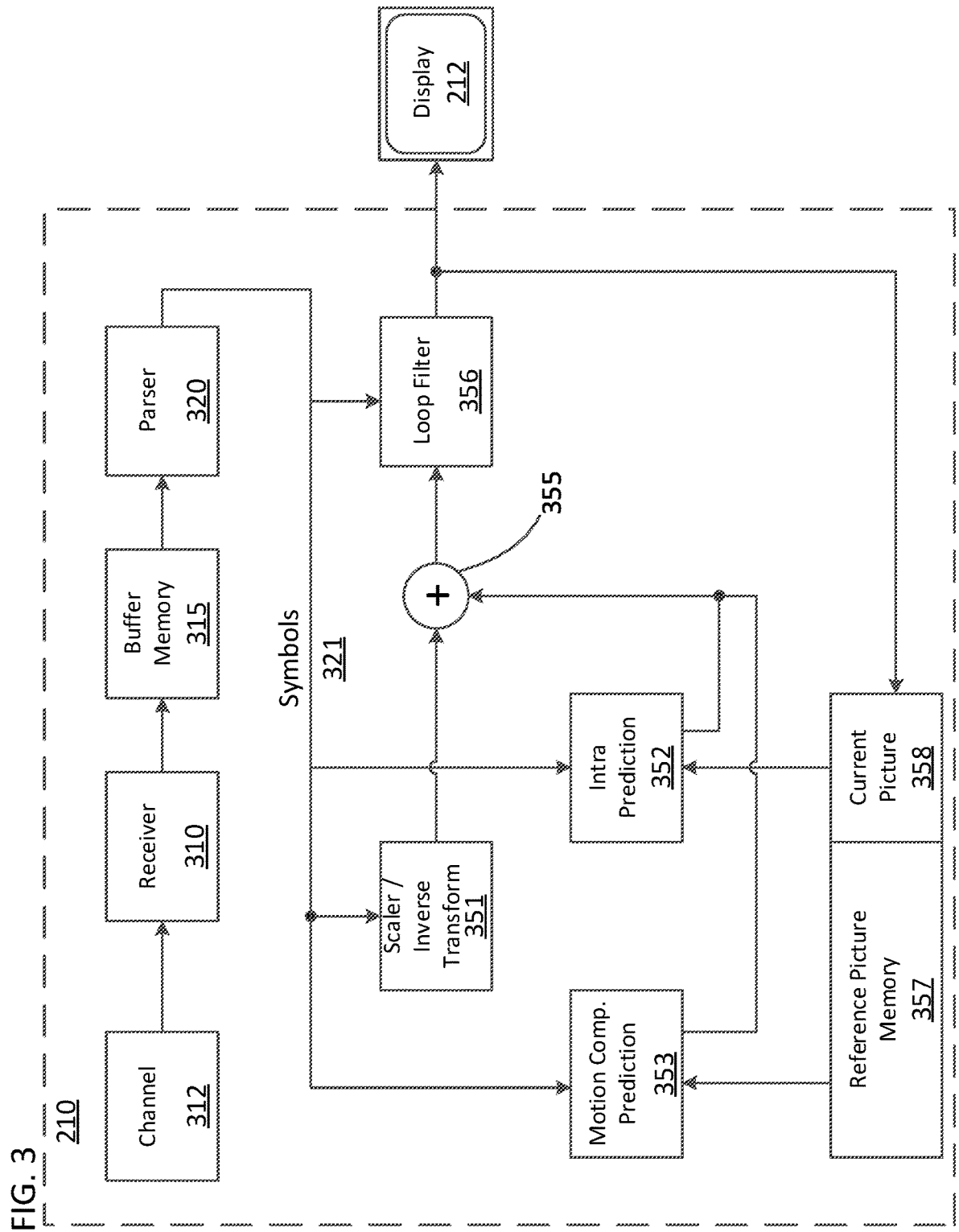
FIG. 3 is a schematic illustration of a simplified block diagram of a decoder in accordance with an embodiment.

FIG. 3 illustrates an example functional block diagram of a video decoder (210) that is attached to a display (212) according to an embodiment of the present disclosure.

The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory 0. In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosynchronous network, the buffer (315) may not be used, or can be small. For use on best effort packet networks such as the Internet, the buffer (315) may be required, can be comparatively large, and can be of adaptive size.

The video decoder (210) may include a parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) can output blocks including sample values that can be input into the aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so to generate output sample information. The addresses within the reference picture memory (357), from which the Motion Compensation Prediction unit (353) fetches prediction samples, can be controlled by motion vectors. The motion vectors may be available to the Motion Compensation Prediction unit (353) in the form of symbols (321) that can have, for example, X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to a render device such as a display (212), as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture can become part of the reference picture memory (357), and a fresh current picture memory can be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
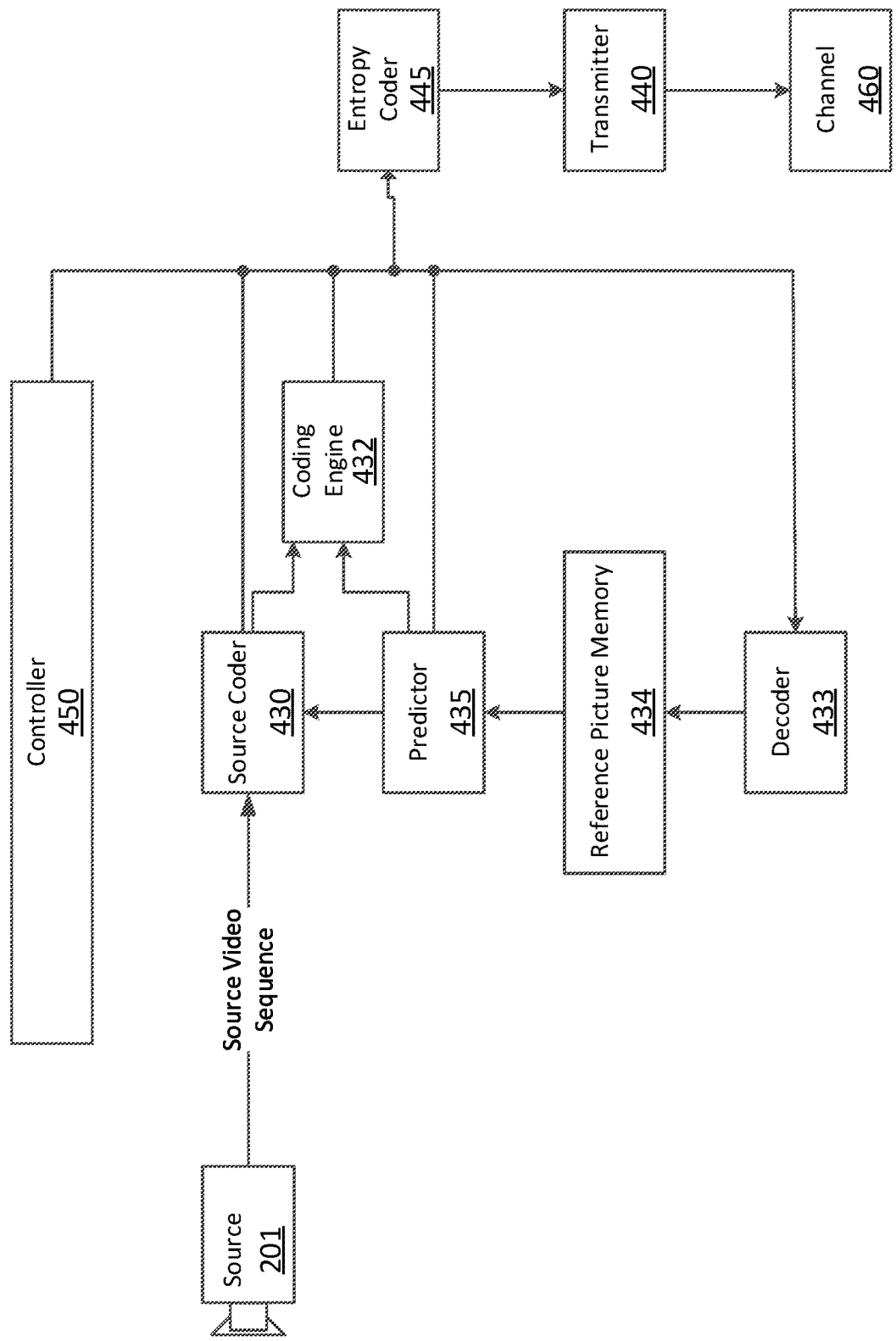
FIG. 4 is a schematic illustration of a simplified block diagram of an encoder in accordance with an embodiment.

FIG. 4 illustrates an example functional block diagram of a video encoder (203) associated with a video source (201) according to an embodiment of the present disclosure.

The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of controller (450). The controller (450) may also control other functional units as described below and may be functionally coupled to these units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an over-simplified description, a coding loop can consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) can be the same as of a "remote" decoder (210), which has already been described in detail above in conjunction with FIG. 3. However, as symbols are available and en/decoding of symbols to a coded video sequence by the entropy coder (445) and the parser (320) can be lossless, the entropy decoding parts of decoder (210), including channel (312), receiver (310), buffer (315), and parser (320) may not be fully implemented in the local decoder (433).

An observation that can be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Before describing certain aspects of embodiments of the disclosure in more detail, a few terms are introduced below that are referred to in the remainder of this description.

"Sub-Picture" henceforth refers to, in some cases, a rectangular arrangement of samples, blocks, macroblocks, coding units, or similar entities that are semantically grouped, and that may be independently coded in changed resolution. One or more sub-pictures may form a picture. One or more coded sub-pictures may form a coded picture. One or more sub-pictures may be assembled into a picture, and one or more sub pictures may be extracted from a picture. In certain environments, one or more coded sub-pictures may be assembled in the compressed domain without transcoding to the sample level into a coded picture, and in the same or certain other cases, one or more coded sub-pictures may be extracted from a coded picture in the compressed domain.

"Adaptive Resolution Change" (ARC) henceforth refers to mechanisms that allow the change of resolution of a picture or sub-picture within a coded video sequence, by the means of, for example, reference picture resampling. "ARC parameters" henceforth refer to the control information required to perform adaptive resolution change, that may include, for example, filter parameters, scaling factors, resolutions of output and/or reference pictures, various control flags, and so forth.

Systems and methods of the present disclosure may be used separately or combined in any order. In the present disclosure, the term "DeltaQ" may refer to a set of all offset values or combination of offset values applied to "base_q_idx." The elements of set "DeltaQ" includes, but is not limited to: {"DeltaQYDc", "DeltaQUDc", "DeltaQVDc", "DeltaQUAc", "DeltaQVAc", "base_y_dc _delta_q", "base_uv_ dc_delta_ q", "DeltaQYDc"-"base_y_dc _delta_q", "DeltaQUDc"-"base_uv_ dc_delta_ q", "DeltaQVDc"-"base_uv_ dc_delta_ q"}. In the present disclosure, the qindex value associated with lossless coding is denoted as "qindex_lossless". The value of "qindex_lossless" in AV1 is 0.

Embodiments of the present disclosure may implement aspects of the related art referenced herein, and may be different from the related art as described below.

According to one or more embodiments, the conditions required to be met for lossless/lossy mode may be different from the related art.

In one embodiment, lossless mode is applied when "base_q_idx" is equal to "qindex_lossless" and all elements of "DeltaQ" is less than or equal to "qindex_lossless".

In one embodiment, lossy mode is applied when "base_q_idx" is not equal to "qindex_lossless" or "DeltaQ" is different from "qindex_lossless".

In one embodiment, lossless mode is applied when the "qindex" value "qindex_lossless" is applied for all coefficients, regardless whether the coefficients are from AC or DC, or luma or chroma.

According to one or more embodiments, the accessible "qindex_lossless" for lossless mode may be different from the related art.

In one embodiment, if base_q_idx+DeltaQ is less than or equal to zero, "base_q_idx" is equal to "qindex_lossless", and all elements of "DeltaQ" is less than or equal to "qindex_lossless", the clip(base_q_idx+DeltaQ) will result in a value of zero, which may be the "qindex_lossless" value.

In one embodiment, if base_q_idx+DeltaQ is less than or equal to zero, "base_q_idx" is equal to "qindex_lossless", and all elements of "DeltaQ" is less than or equal to "qindex_lossless", the clip(base_q_idx+DeltaQ) will result in a value of A (that may also be the "qindex_lossless" value), wherein A is a fixed positive integer value other than zero.

In one embodiment, when the range of "base_q_idx" values can be configured, the value of A depends on range of "base_q_idx". Example values of "base_q_idx" include, but are not limited to, 51, 63, 127, 255. Example values of A include, but are not limited to, 0, 1, 2, 3, 4.

According to one or more embodiments, the smallest accessible "qindex" for lossy mode may be different from the related art. For example, a decoder of the present disclosure may determine that the mode is lossy or lossless based on determining whether certain conditions are met, and set a floor of the clip function so as to have an appropriate A value (equal or not equal to qindex_lossless).

In one embodiment, if base_q_idx+DeltaQ is less than zero, and "base_q_idx" is not equal to "qindex_lossless" and/or all elements of "DeltaQ" is not less than or equal to "qindex_lossless", clip(base_q_idx+DeltaQ) will result in a "qindex" value of a non-zero value A that is not equal to "qindex_lossless". Example value of A includes, but is not limited to, 1, 2, 3, 4, . . . , 24. For example, a decoder of the present disclosure may set a floor of the clip function such that a value is clipped, and a resulting "qindex" value has a value A that is greater than the "qindex_lossless" value, where "qindex_lossless" equals 0. That is, for example, the floor may be a value n, where n is a positive integer.

In one embodiment, if base_q_idx+DeltaQ is less than zero, and "base_q_idx" is not equal to "qindex_lossless" and/or all elements of "DeltaQ" is not less than or equal to "qindex_lossless", clip(base_q_idx+DeltaQ) will result in a "qindex" value of a value A that is not associated with lossless coding (e.g. not equal to "qindex_lossless"). Example value of A includes, but is not limited to 0, 1, 2, 3, 4, . . . , 24. For example, a decoder of the present disclosure may set a floor of the clip function such that a value is clipped, and a resulting "qindex" has a value A that is different than the "qindex_lossless" value, where "qindex_lossless" equals an integer. That is, for example, the floor may be a value n, where n is greater than the value of "qindex_lossless".

According to one or more embodiments, the quantization step size used for lossless mode may be different from the related art.

In one embodiment, the quantization step used for lossless coding may be the result of the equation $4*POWER(2, precision)$. For example, decoders of the present disclosure may calculate the quantization step for lossless coding by using the above equation. Example values of "precision" include, but are not limited to 0, 1, 2, 3, 4, 5.

According to embodiments, the output of transform (such as Hadamard transform in AV1) applied for lossless coding mode is further right shift by N bit, where N is equal to the value of "precision". For example, in one embodiment, the right shift N is done in such a way that the intermediate coefficients derived during the application of row and column transforms fall within 16+bitdepth_offset bit range, wherein the "bitdepth_offset" depends on the internal bitdepth. Example values of "bitdepth_offset" include, but not limited to, 0, 2, 4. In one embodiment, the value of "bitdepth_offset" used can be different for row and column transforms for a specified internal bitdepth.

According to one or more embodiments, the smallest accessible quantization step size used for lossy mode may be different from the related art.

In one embodiment, the smallest quantization step sized used for lossy coding may be the result of the equation $8*POWER(2, precision)$. For example, decoders of the present disclosure may calculate the smallest accessible quantization step for lossy coding by using the above equation. Example values of "precision" include, but are not limited to 0, 1, 2, 3, 4, and 5.

According to embodiments, the output of transform applied for lossy coding is further right shift by N bit, where N is equal to "precision". For example, in one embodiment, the right shift N is done in such a way that the intermediate coefficients derived during the application of row and column transforms fall within 16+bitdepth_offset bit range, wherein the "bitdepth_offset" depends on the internal bitdepth. Example values of "bitdepth_offset" include, but not limited to, 0, 2, 4. In one embodiment, the value of "bitdepth_offset" used can be different for row and column transforms for a specified internal bitdepth.

Embodiments of the present disclosure may comprise at least one processor and memory storing computer instructions. The computer instructions, when executed by the at least one processor, may be configured to cause the at least one processor to perform the functions of the embodiments of the present disclosure.

Figure 7:
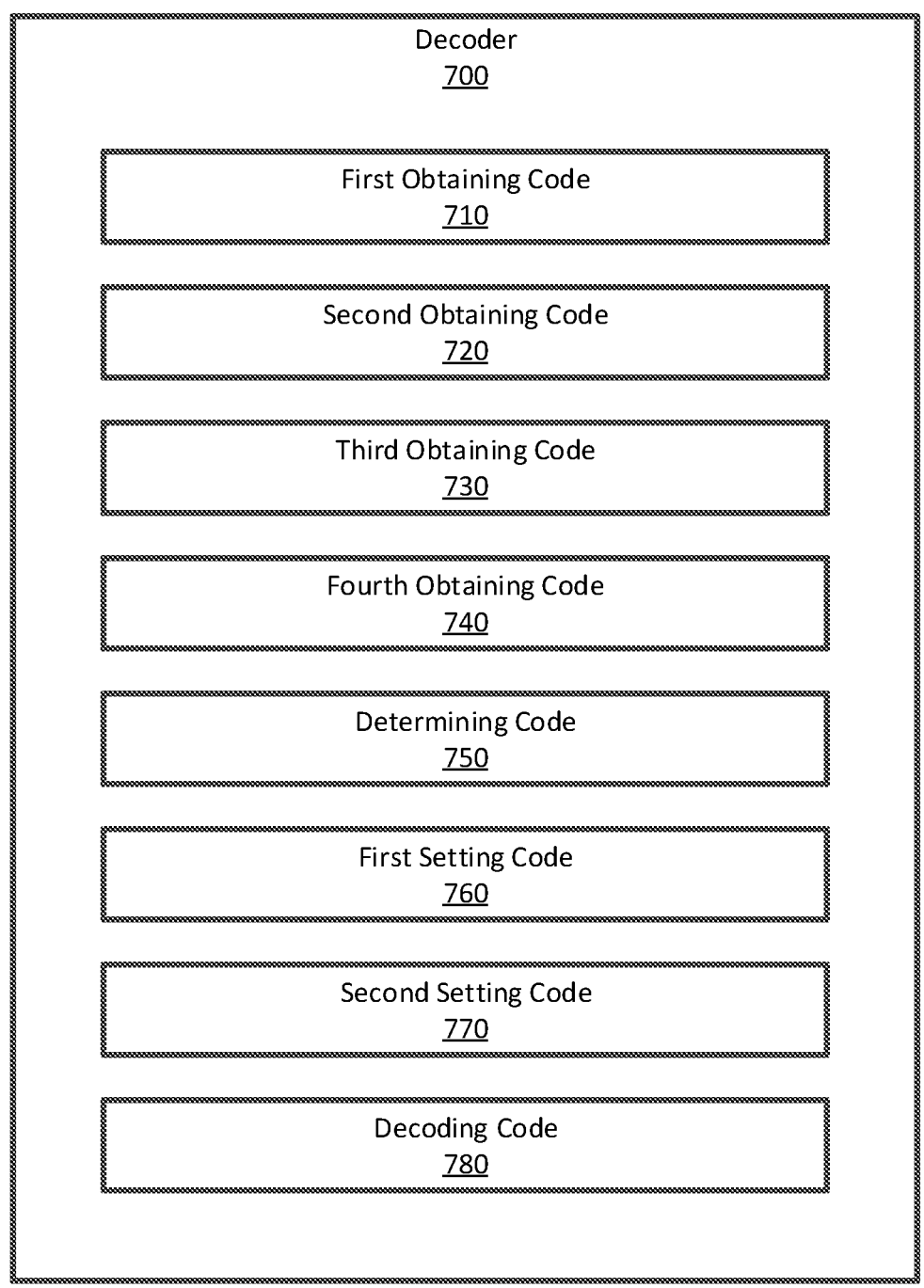
FIG. 7 is a schematic illustration of a simplified block diagram of aspects of a decoder in accordance with an embodiment.

For example, with reference to FIG. 7, a decoder (700) of the present disclosure may comprise at least one processor and memory storing computer instructions. The computer instructions may comprise first obtaining code (710), second obtaining code (720), third obtaining code (730), fourth obtaining code (740), determining code (750), first setting code (760), second setting code (770), and decoding code (780). The decoder (700) may implement the video decoder (210) illustrated in FIGS. 2-3.

The first obtaining code (710) may be configured to cause the at least one processor to obtain a first syntax element (e.g. base_q_idx) that indicates a first quantization index value for an AC coefficient of a coded image.

The second obtaining code (720) may be configured to cause the at least one processor to obtain at least one second syntax element (e.g. one or more elements of the set DeltaQ) that indicates an offset value.

The third obtaining code (730) may be configured to cause the at least one processor to obtain a second quantization index value for another coefficient of the coded image by combining the first quantization index value of the first syntax element and the offset value of the at least one second syntax element to obtain a combined value, and modifying, in a case where the combined value is less than a predetermined minimum value, the combined value to be the predetermined minimum value as the second quantization index value. The combining may refer to combining the value of "base_q_idx" with the value of one or more elements of "DeltaQ", as described in the present disclosure. The modifying may refer to applying a clip function as described in the present disclosure.

The fourth obtaining code (740) may be configured to cause the at least one processor to obtain a quantization step size that corresponds to the second quantization index value that is obtained. For example, according to one or more embodiments, the fourth obtaining code (740) may be configured to cause the at least one processor to obtain the quantization step size that corresponds to the second quantization index value by using at least one lookup table that indicates a correspondence between a plurality of quantization index values and a plurality of quantization step sizes.

The determining code (750) may be configured to cause the at least one processor to determine whether a mode in which the coded image is to be decoded is a lossy mode or a lossless mode based on, for example, determining whether the first quantization index value is equal to a quantization index value (e.g. "qindex_lossless") associated with lossless coding, and based on determining whether the offset value is less than or equal to the quantization index value associated with the lossless coding.

The first setting code (760) may be configured to cause the at least one processor to set the predetermined minimum value (e.g. the lower boundary of the clip function) to a value, that is compared to the combined value, based on the determining of the determining code. For example, according to one or more embodiments, the first setting code (760) may be configured to cause the at least one processor to set the predetermined minimum value to the quantization index value associated with the lossless coding, based on determining that the first quantization index value is equal to the quantization index value associated with the lossless coding, and based on determining that the offset value is less than or equal to the quantization index value associated with the lossless coding. According to one or more embodiments, the first setting code (760) may be configured to cause the at least one processor to set the predetermined minimum value to a value different from the quantization index value associated with the lossless coding, based on determining that the first quantization index value is not equal to the quantization index value associated with the lossless coding, or based on determining that the offset value is greater than the quantization index value associated with the lossless coding. The quantization index value (e.g. qindex_lossless) associated with the lossless coding may be 0 or a value different from 0. According to the above, the first setting code (760) may be configured to modify the clip functions of the present disclosure.

The second setting code (770) may be configured to cause the at least one processor to set, in the at least one lookup table, a quantization step size associated with the quantization index value associated with the lossless coding. For example, according to one or more embodiments, the second setting code (770) may be configured to cause the at least one processor to perform an operation of multiplying $2^x$ by 4, wherein x is predetermined value, and to set, in the at least one lookup table, the quantization step size associated with the quantization index value associated with the lossless coding to a result of the operation. Alternatively or additionally, the second setting code (770) may be configured to cause the at least one processor to set, in the at least one lookup table, a quantization step size associated with one of the plurality of quantization index values associated with lossy coding. For example, according to one or more embodiments, the second setting code (770) may be configured to cause the at least one processor to perform an operation of multiplying $2^x$ by 8, wherein x is a predetermined value, and to set, in the at least one lookup table, the quantization step size associated with one of the plurality of quantization index values associated with the lossy coding to a result of the operation.

The decoding code (780) may be configured to cause the at least one processor to decode the coded image in the lossy mode or the lossless mode based on the determining of the determining code, and by using the quantization step size that is obtained.

The techniques of embodiments of the present disclosure described above, can be implemented as computer software using computer-readable instructions and physically stored in one or more computer-readable media. For example, FIG. 8 shows a computer system (900) suitable for implementing embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
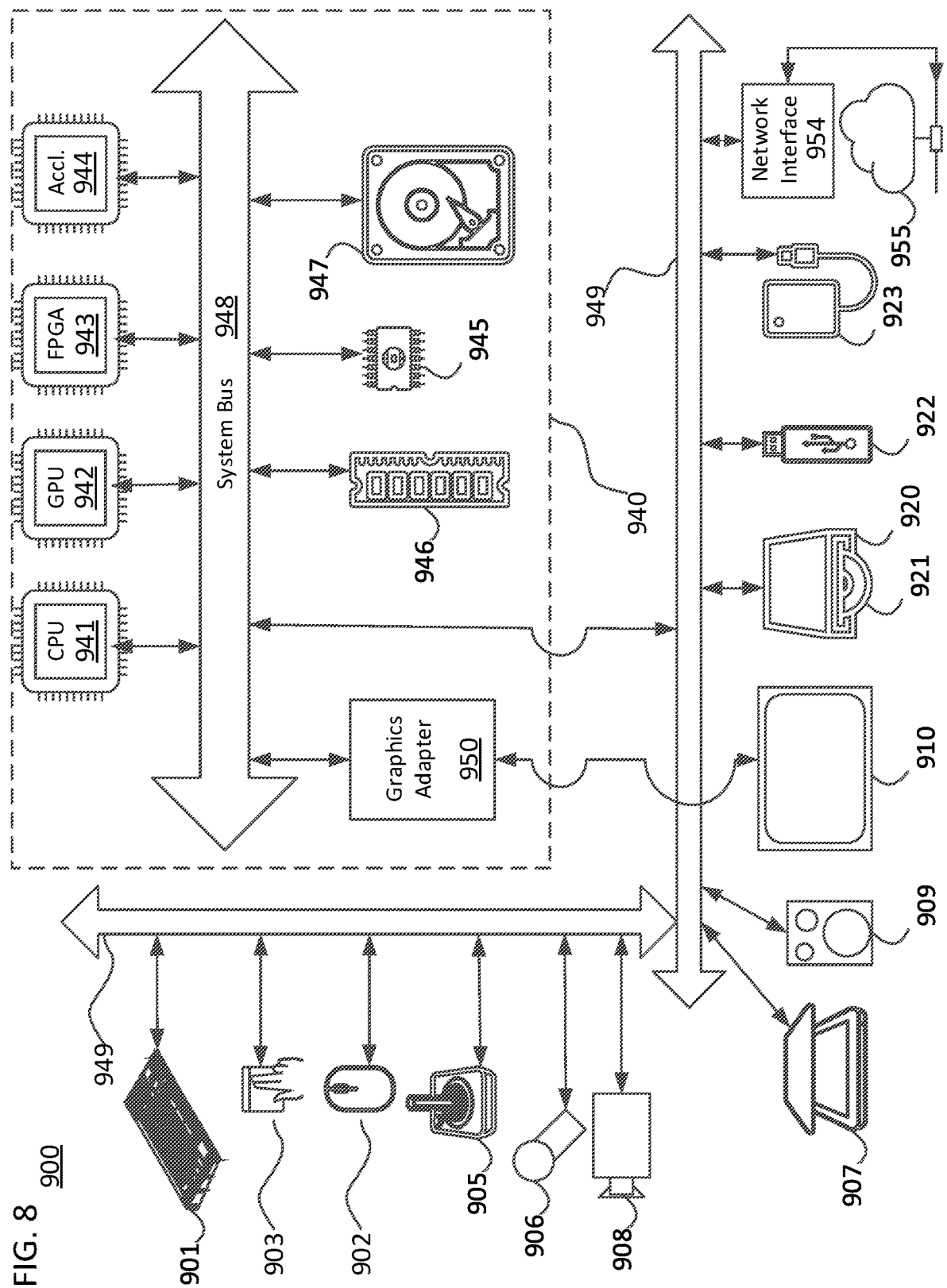
FIG. 8 is a diagram of a computer system suitable for implementing embodiments.

The components shown in FIG. 8 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove, joystick (905), microphone (906), scanner (907), and camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove, or joystick (905), but there can also be tactile feedback devices that do not serve as input devices). For example, such devices may be audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900); others are commonly integrated into the core of the computer system 900 by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment (955). Certain protocols and protocol stacks can be used on each of those networks and network interfaces as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include PCI, USB, and the like. A graphics adapter 950 may be included in the core 940.

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A system comprising:
   at least one memory configured to store computer program code; and
   at least one processor configured to access the computer program code and operate as instructed by the computer program code, the computer program code comprising:
   first obtaining code configured to cause the at least one processor to obtain a first syntax element that indicates a first quantization index value for an AC coefficient of a coded image;
   second obtaining code configured to cause the at least one processor to obtain at least one second syntax element that indicates an offset value;
   third obtaining code configured to cause the at least one processor to obtain a second quantization index value for another coefficient of the coded image by combining the first quantization index value of the first syntax element and the offset value of the at least one second syntax element to obtain a combined value, and modifying, in a case where the combined value is less than a predetermined minimum value, the combined value to be the predetermined minimum value as the second quantization index value;

fourth obtaining code configured to cause the at least one processor to obtain a quantization step size that corresponds to the second quantization index value that is obtained;

determining code configured to cause the at least one processor to determine whether a mode in which the coded image is to be decoded is a lossy mode or a lossless mode based on determining whether the first quantization index value is equal to a quantization index value associated with lossless coding, and based on determining whether the offset value is less than or equal to the quantization index value associated with the lossless coding;

first setting code configured to cause the at least one processor to set the predetermined minimum value to a value, that is compared to the combined value, based on the determining of the determining code; and decoding code configured to cause the at least one processor to decode the coded image in the lossy mode or the lossless mode based on the determining of the determining code, and by using the quantization step size that is obtained.

2. The system of claim 1, wherein
the first setting code is configured to cause the at least one processor to set the predetermined minimum value to the quantization index value associated with the lossless coding, based on determining that the first quantization index value is equal to the quantization index value associated with the lossless coding, and based on determining that the offset value is less than or equal to the quantization index value associated with the lossless coding.

3. The system of claim 2, wherein
the quantization index value associated with the lossless coding is 0.

4. The system of claim 2, wherein
the quantization index value associated with the lossless coding is a positive integer value greater than 0.

5. The system of claim 1, wherein
the first setting code is configured to cause the at least one processor to set the predetermined minimum value to a value different from the quantization index value associated with the lossless coding, based on determining that the first quantization index value is not equal to the quantization index value associated with the lossless coding, or based on determining that the offset value is greater than the quantization index value associated with the lossless coding.

6. The system of claim 5, wherein
the quantization index value associated with the lossless coding is 0.

7. The system of claim 5, wherein
the quantization index value associated with the lossless coding is a value different from 0.

8. The system of claim 1, wherein
the fourth obtaining code is configured to cause the at least one processor to obtain the quantization step size that corresponds to the second quantization index value by using at least one lookup table that indicates a correspondence between a plurality of quantization index values and a plurality of quantization step sizes, and the computer program code further comprises second setting code configured to cause the at least one processor to set, in the at least one lookup table, a quantization step size associated with the quantization index value associated with the lossless coding.

9. The system of claim 8, wherein
the second setting code is configured to cause the at least one processor to perform an operation of multiplying $2^x$ by 4, wherein x is predetermined value, and to set, in the at least one lookup table, the quantization step size associated with the quantization index value associated with the lossless coding to a result of the operation.

10. The system of claim 1, wherein
the fourth obtaining code is configured to cause the at least one processor to obtain the quantization step size that corresponds to the second quantization index value by using at least one lookup table that indicates a correspondence between a plurality of quantization index values and a plurality of quantization step sizes, and the computer program code further comprises second setting code configured to cause the at least one processor to set, in the at least one lookup table, a quantization step size associated with one of the plurality of quantization index values associated with lossy coding.

11. The system of claim 10, wherein
the second setting code is configured to cause the at least one processor to perform an operation of multiplying $2^x$ by 8, wherein x is a predetermined value, and to set, in the at least one lookup table, the quantization step size associated with one of the plurality of quantization index values associated with the lossy coding to a result of the operation.

12. A method performed by at least one computer processor, comprising:

obtaining a first syntax element that indicates a first quantization index value for an AC coefficient of a coded image;

obtaining at least one second syntax element that indicates an offset value;

obtaining a second quantization index value for another coefficient of the coded image by combining the first quantization index value of the first syntax element and the offset value of the at least one second syntax element to obtain a combined value, and modifying, based on the combined value being less than a predetermined minimum value, the combined value to be the predetermined minimum value as the second quantization index value;

obtaining a quantization step size that corresponds to the second quantization index value that is obtained;

determining whether a mode in which the coded image is to be decoded is a lossy mode or a lossless mode based on determining whether the first quantization index value is equal to a quantization index value associated with lossless coding, and based on determining whether the offset value is less than or equal to the quantization index value associated with the lossless coding;

setting the predetermined minimum value to a value, that is compared to the combined value, based on the determining; and decoding the coded image in the lossy mode or the lossless mode based on the determining, and by using the quantization step size that is obtained.

13. The method of claim 12, wherein
the setting comprises setting predetermined minimum value to the quantization index value associated with the lossless coding, based on determining that the first quantization index value is equal to the quantization index value associated with the lossless coding, and based on determining that the offset value is less than or equal to the quantization index value associated with the lossless coding.

14. The method of claim 13, wherein
the quantization index value associated with the lossless coding is a positive integer value greater than 0.

15. The method of claim 12, wherein
the setting comprises setting the predetermined minimum value to a value different from the quantization index value associated with the lossless coding, based on determining that the first quantization index value is not equal to the quantization index value associated with the lossless coding, or based on determining that the offset value is greater than the quantization index value associated with the lossless coding.

16. The method of claim 13, wherein
the quantization index value associated with the lossless coding is a value different from 0.

17. The method of claim 12, wherein
the obtaining the quantization step size comprises obtaining the quantization step size that corresponds to the second quantization index value by using at least one lookup table that indicates a correspondence between a plurality of quantization index values and a plurality of quantization step sizes, and
the method further comprises setting, in the at least one lookup table, a quantization step size associated with the quantization index value associated with the lossless coding.

18. The method of claim 12, wherein
the obtaining the quantization step size comprises obtaining the quantization step size that corresponds to the second quantization index value by using at least one lookup table that indicates a correspondence between a plurality of quantization index values and a plurality of quantization step sizes, and
the method further comprises setting, in the at least one lookup table, a quantization step size associated with one of the plurality of quantization index values associated with lossy coding.

19. The method of claim 18, wherein
the setting comprises performing an operation of multiplying $2^x$ by 8, wherein x is a predetermined value, and setting, in the at least one lookup table, the quantization step size associated with the one of the plurality of quantization index values associated with the lossy coding to a result of the operation.

20. A non-transitory computer-readable medium storing computer instructions that are configured to, when executed by at least one processor, cause the at least one processor to:
obtain a first syntax element that indicates a first quantization index value for an AC coefficient of a coded image;
obtain at least one second syntax element that indicates an offset value;
obtain a second quantization index value for another coefficient of the coded image by combining the first quantization index value of the first syntax element and the offset value of the at least one second syntax element to obtain a combined value, and modifying, based on the combined value being less than a predetermined minimum value, the combined value to be the predetermined minimum value as the second quantization index value;
obtain a quantization step size that corresponds to the second quantization index value that is obtained;
determine whether a mode in which the coded image is to be decoded is a lossy mode or a lossless mode based on determining whether the first quantization index value is equal to a quantization index value associated with lossless coding, and based on determining whether the offset value is less than or equal to the quantization index value associated with the lossless coding;
set the predetermined minimum value to a value, that is compared to the combined value, based on the determining; and
decode the coded image in the lossy mode or the lossless mode based on the determining, and by using the quantization step size that is obtained.

* * * * *